United States Patent
Abrishamkar et al.

(10) Patent No.: US 6,539,211 B1
(45) Date of Patent: Mar. 25, 2003

(54) EFFICIENT SYSTEM AND METHOD FOR FACILITATING QUICK PAGING CHANNEL DEMODULATION VIA AN EFFICIENT OFFLINE SEARCHER IN A WIRELESS COMMUNICATIONS SYSTEM

(75) Inventors: Farrokh Abrishamkar, San Diego, CA (US); Mark Charles Roh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/696,160

(22) Filed: Oct. 23, 2000

Related U.S. Application Data
(60) Provisional application No. 60/176,478, filed on Jan. 17, 2000.

(51) Int. Cl.[7] .................................................. H04B 1/18
(52) U.S. Cl. ...................... 455/161.2; 455/434; 455/458
(58) Field of Search ............................. 455/161.1, 161.2, 455/161.3, 422, 434, 458; 340/7.42, 7.43; 375/142, 150

(56) References Cited

U.S. PATENT DOCUMENTS 6,111,865 A * 8/2000 Butler et al. ................ 340/7.42
6,243,561 B1 * 6/2001 Butler et al. ................ 455/458

FOREIGN PATENT DOCUMENTS

WO    9922352    5/1999 ........... G08C/17/00
WO    9943180    8/1999 ............ H04Q/7/38

OTHER PUBLICATIONS

Sarkar, et al., "Common–channel Soft Handoff in cdma2000—The Paging Channel" IEEE Radio and Wireless Conference, vol. 48, No. 6, Aug. 1999, pps. 938–950.

Sarka, et al., "Soft Handoff on the Quick Paging Channel", Global Telecommunications Conference, Globecom 99, pps. 2794–2798.

* cited by examiner

Primary Examiner—Nay Maung
(74) Attorney, Agent, or Firm—Philip R. Wadsworth; Charles D. Brown; George C. Pappas

(57) ABSTRACT

A system for facilitating the detection and successful decoding of a quick paging channel adapted for use with a wireless communications system supporting a primary paging channel and a quick paging channel. The system includes a first mechanism for detecting a pilot signal associated with the quick paging channel based on a received signal and includes a coherent integrator of a first length and a noncoherent integrator of a second length. The second mechanism determines receiver operating characteristics of the system based on the pilot signal and a quick paging channel signal associated with the quick paging channel. The third mechanism optimizes the first length and the second length based on the receiver operating characteristics. In a specific embodiment, the first mechanism includes a CDMA receive chain for receiving the received signal and providing a digital received signal in response thereto to a sample Random Access Memory (RAM). The sample RAM includes a mechanism for sampling the digital received signal at predetermined time slots and providing a sampled received signal in response thereto. An interpolator adjusts the rate of the sampled received signal and provides a rate-adjusted signal in response thereto. The first mechanism includes a searcher that includes the first coherent integrator, a second coherent integrator, and the noncoherent integrator. A complex despreader correlates the rate-adjusted received signal with a pseudo noise candidate code and providing a correlation result in response thereto.

28 Claims, 5 Drawing Sheets

EFFICIENT SYSTEM AND METHOD FOR FACILITATING QUICK PAGING CHANNEL DEMODULATION VIA AN EFFICIENT OFFLINE SEARCHER IN A WIRELESS COMMUNICATIONS SYSTEM

RELATED APPLICATIONS

This application claims priority to U.S. Provisional Application Serial No. 60/176,478, filed on Jan. 17, 2000.

BACKGROUND OF THE INVENTION

1. Field of Invention

This invention relates to wireless communications systems. Specifically, the present invention relates to systems and methods for demodulating a quick paging channel employed to facilitate offline processing in a wireless communications system.

2. Description of the Related Art

Wireless communications systems are employed in a variety of demanding applications ranging from search and rescue to Internet applications. Such applications require reliable, cost-effective, and space-efficient communications systems and accompanying wireless phones.

Cellular telecommunications systems, such as Code Division Multiple Access (CDMA) communications systems, are often characterized by a plurality of mobile stations (e.g. cellular telephones, mobile units, wireless telephones, or mobile phones) in communication with one or more Base Station Transceiver Subsystems (BTS's). Signals transmitted by the mobile stations are received by a BTS and often relayed to a Mobile Switching Center (MSC) having a Base Station Controller (BSC). The MSC then routes the signal to a Public Switched Telephone Network (PSTN) or to another wireless phone. Similarly, a signal may be transmitted from the PSTN to a wireless phone via a base station or BTS and an MSC.

Wireless communications networks often employ various channels, such as paging channels and traffic channels, as disclosed in the IS-95 cellular telephone standard, to facilitate communications between a wireless phone and a BTS. Paging messages are transmitted over a paging channel by a BTS to an associated wireless phone to indicate an incoming call. When a wireless phone detects a paging message, a sequence of service negotiation messages is subsequently transmitted between the wireless phone and an associated BTS to establish a traffic channel. A traffic channel typically supports voice and data traffic.

Conventionally, a wireless phone continuously monitors the paging channel for pages indicative of incoming calls. The receiver of the wireless phone remains on while signal processing circuitry within the-wireless phone demodulates the paging channel to determine if a page was sent. Unfortunately, the receiver draws excess power, which significantly limits phone battery life.

Systems for minimizing wireless phone power consumption are often employed in the wireless phone and/or accompanying network to extend phone battery life and associated standby time. To improve standby time, some newer wireless phones operate in slotted mode. In slotted mode, the receiver of the wireless phone is periodically activated in accordance with predetermined paging slots established in accordance with the IS-95 telecommunications standard. An associated BTS transmits pages during the paging slots. Wireless phone standby time is extended by periodically powering-up the phone receiver and demodulating the paging channel rather than continuously demodulating the primary paging channel as done previously.

Unfortunately, paging channel messages are often long and require extensive processing, which increases phone power consumption and reduces battery life and associated standby time. Furthermore, the design of such systems and the associated paging channels necessitates redundant processing of the lengthy paging channel messages to detect incoming calls. This further reduces phone battery life.

Further increases in phone standby time are achieved via a relatively new addition to the IS-95 telecommunications standard known as offline processing. In a wireless communications network employing offline processing, a pair of quick paging channel (QPCH) symbols is periodically transmitted to the wireless phone. The quick paging channel symbols, i.e., quick pages, indicate the presence or absence of an incoming call to be established on a forthcoming traffic channel (F-CCCH). The QPCH symbols arrive in pairs at 9600 bits per second (bps) or 4800 bps. The time slots at which the QPCH symbols are transmitted from an associated BTS are known by the wireless phone, which periodically powers-up the receiver at corresponding time slots.

In a wireless phone employing offline processing, the wireless phone receiver powers-up, samples the QPCH, then immediately powers-down the receiver and processes the QPCH sample offline (when the receiver is off). Subsequent analysis of the QPCH sample or samples indicates whether the wireless phone should power-up the receiver and demodulate the paging channel to receive an incoming page associated with an incoming call. Use of the QCPH helps minimize receiver activation time and the instances of complete paging channel demodulation, enabling a reduction in wireless phone power consumption and an associated extension in phone battery life. Unfortunately, existing systems and methods for detecting pilot signals and associated multipath signal components required to demodulate the QPCH are often undesirably large, expensive, consume excess power, and are generally inefficient.

Hence, a need exists in the art for an efficient system and method for searching for and detecting pilot signals and associated multipath components required to demodulate the QPCH. There is a further need for a method for selecting appropriate searcher parameters for minimizing required hardware. There is a further need for a space-efficient system that can efficiently demodulate the QPCH channel while consuming minimal power.

SUMMARY OF THE INVENTION

The need in the art is addressed by the system for facilitating detection and successful decoding of a Quick Paging Channel (QPCH) of the present invention. In the illustrative embodiment, the inventive system is adapted for use with a wireless communications system that supports a primary paging channel and a quick paging channel. The system includes a first mechanism for detecting a pilot signal associated with the quick paging channel based on a received signal. The first mechanism includes a coherent integrator of a first length and a noncoherent integrator of a second length. The second mechanism determines receiver operating characteristics of the system based on the pilot signal. The third mechanism optimizes the first length and the second length based on the operating characteristics.

In a specific embodiment, the first mechanism includes a CDMA receive chain for receiving the received signal and providing a digital received signal to a sample random access memory in response thereto. The sample random access memory includes a mechanism for sampling the digital received signal at predetermined time slots and providing a sampled received signal in response thereto. An interpolator adjusts the rate of the sampled received signal and provides a rate-adjusted signal in response thereto. The first mechanism includes a searcher that includes the first coherent integrator, a second coherent integrator, and the noncoherent integrator. The searcher further includes a complex despreader/correlator for correlating the rate-adjusted received signal with a pseudo noise candidate code and providing a correlation result in response thereto. The first integrator and the second integrator integrate the correlation result over a predetermined number of chips corresponding to the first length and provide first and second integrated values, respectively, in response thereto. The searcher further includes a mechanism for squaring the first and second integrated values and providing first and second squared values, respectively, in response thereto. The searcher further includes a mechanism for adding the first and second squared values and providing a sum in response thereto. The noncoherent integrator integrates the sum over a predetermined number of values and outputs an estimate or estimates of the pilot signal in response thereto. The predetermined number corresponds to the second length.

In a more specific embodiment, the first mechanism further includes a mechanism for computing a pilot energy associated with the pilot signal from the pilot estimate(s). The second mechanism includes a mechanism for determining the receiver operating characteristics based on the pilot estimate(s) and the pilot energy and a demodulated QPCH channel. The third mechanism includes a mechanism for computing, based on the receiver operating characteristics, optimal values for the first length and the second length and selectively adjusting the first length and the second length in response thereto. The first length is 512 and the second length is less than or equal to 4.

The novel design of the present invention is facilitated by the second mechanism that provides receiver operating characteristics based on a pilot signal and the QPCH channel. The receiver operating characteristics are then employed by the third mechanism to optimize integration length parameters of the searcher, which results in a significant reduction in the requisite size of the sample random access memory.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
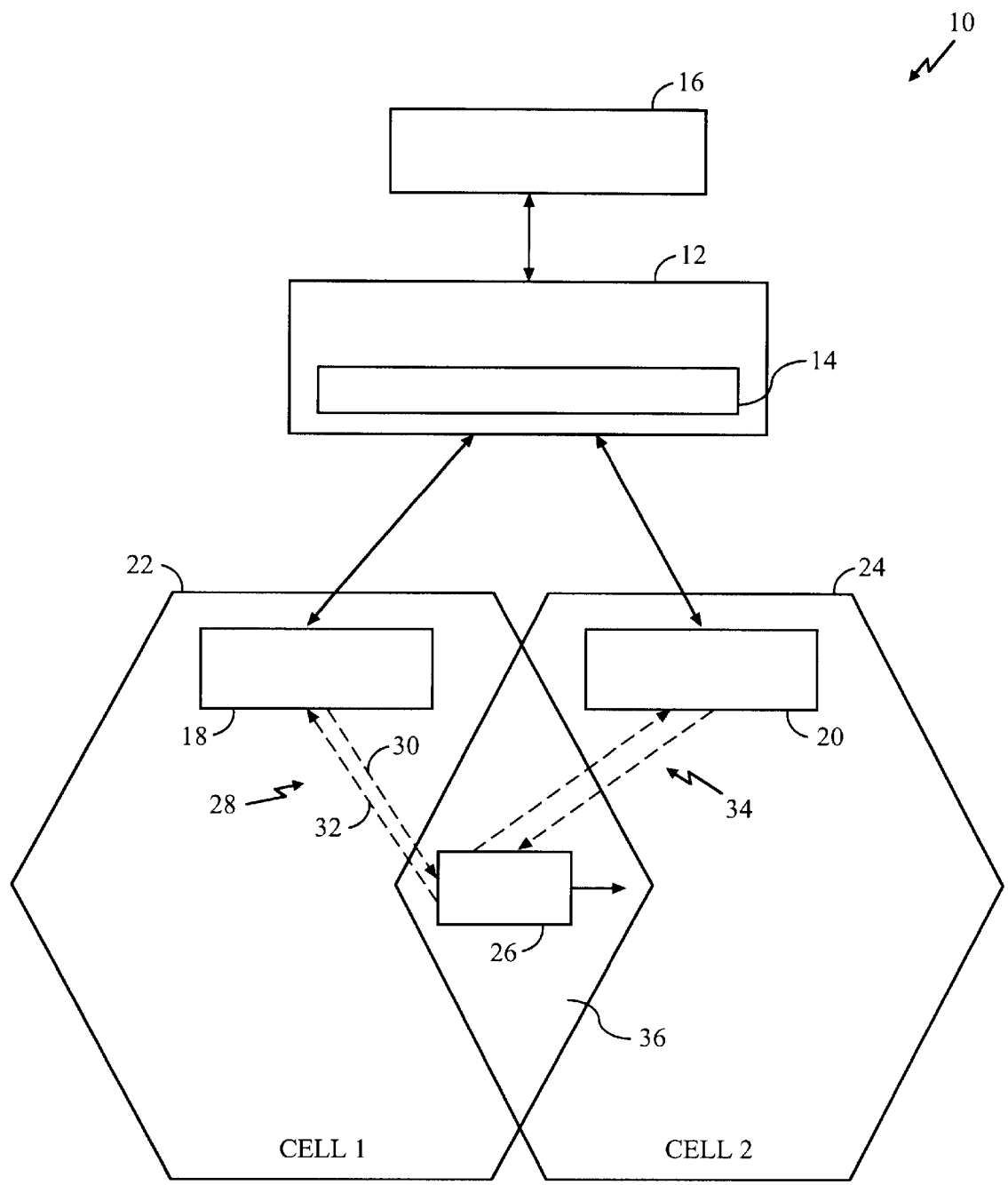
FIG. 1 is a diagram of an exemplary wireless communications system constructed in accordance with the teachings of the present invention.

FIG. 1 is a block diagram of an exemplary wireless communications system 10 for which the present invention is adapted. The system 10 includes a Mobile Switching Center (MSC) 12 having a Base Station Controller (BSC) 14. A Public Switched Telephone Network (PSTN) 16 routes calls from telephone lines and other networks and communications devices (not shown) to and from the MSC 12. The MSC 12 routes calls from the PSTN 16 to and from a first BTS 18 and a second BTS 20 associated with a first cell 22 and a second cell 24, respectively. The BTS's 18 and 20 are often called cell controllers.

The MSC 12 routes calls between the BTS's 18 and 20. The first BTS 18 directs calls to the first mobile station 26 within the first cell 22 via a first communications link 28. The communications link 28 is a two-way link having a forward link 30 and a reverse link 32. Typically, when the BTS 18 has established voice communications with the mobile station 26, the link 28 is characterized as a traffic channel. While only two BTS's 18 and 20 are shown in FIG. 1, more BTS's or fewer BTS's may be employed without departing from the scope of the present invention.

When the mobile station 26 moves from the first cell 22 to the second cell 24, the mobile station 26 is handed off to the second BTS 20. Handoff typically occurs in an overlap region 36 where the first cell 22 overlaps the second cell 24. In a soft handoff, the mobile station 26 establishes a second communications link 34 with the target BTS 20 in addition to the first communications link 28 with the source BTS 18. During a soft handoff, both the first link 28 and the second link 34 are maintained simultaneously. After the mobile station 26 has crossed into the second cell 24, it may drop the first communications link 28. In a hard handoff, the communications link 34 is not established. When the mobile station 26 moves from the first cell 22 to the second cell 24, the link 28 to the source BTS 18 is dropped and a new link is formed with the target BTS 20.

Figure 2:
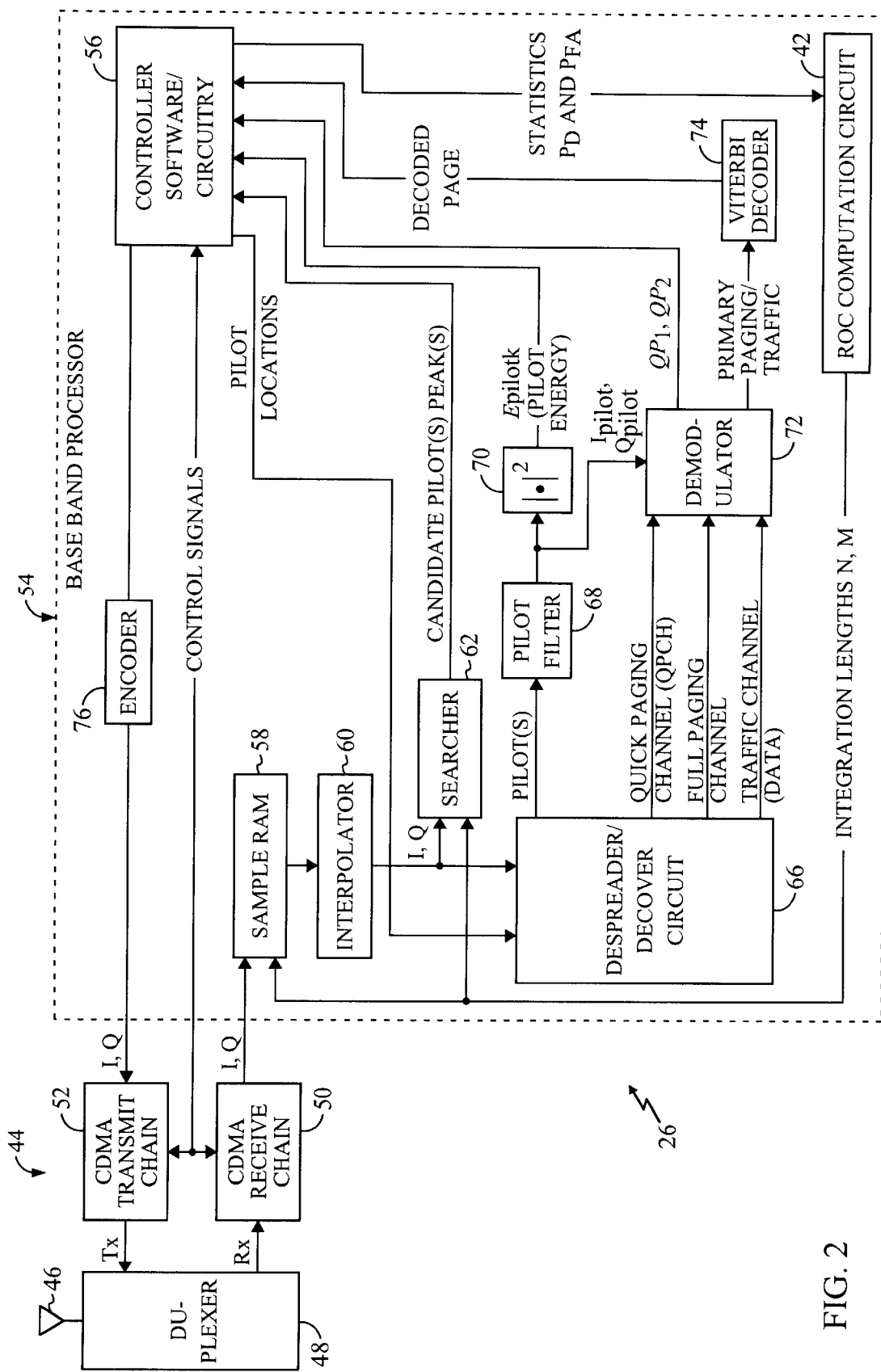
FIG. 2 is a more detailed diagram of the mobile station of FIG. 1 showing the QPCH searcher of the present invention.

FIG. 2 is a more detailed diagram of the wireless phone 26, i.e., mobile station 26 of FIG. 1 showing a Receiver Operating Characteristics (ROC) computation circuit 42, a sample Random Access Memory 58, and a unique searcher 62, constructed in accordance with the teachings of the present invention. For clarity, various components are omitted from FIG. 2, such as Intermediate Frequency (IF) to baseband converters, mixers, downconverters, oscillators, timers, power supplies, and amplifiers, however those skilled in the art will know where and how to implement the additional requisite components.

The mobile station 26 includes a transceiver 44 having an antenna 46 that is connected to a duplexer 48. The duplexer 48 is connected to an input of a CDMA receive chain 50 and to an output of a CDMA transmit chain 52. A baseband processor 54 is connected to the CDMA transceiver 44 and includes a controller 56, the sample Random Access Memory (RAM) 58, an interpolator 60, the searcher 62, a received energy estimator 64, a despreader/decover circuit 66, a pilot estimator (filter) 68, a pilot energy computation circuit 70, a demodulator 72, the ROC computation circuit 42, a decoder 74, and an encoder 76.

The controller 56 is connected to a bus 78 that provides control input to the CDMA transmit chain (transmitter) 52 and the CDMA receive chain (receiver) 50. An output of the CDMA receive chain 50 is a digital receive signal that is input to the sample RAM 58 of the baseband processor 54.

An output of the sample RAM 58 is input to the interpolator 60. An output of the interpolator 60 is connected to inputs of the searcher 62 and the despreader/decover circuit 66. An output of the searcher 62 represents candidate pilot signal peaks, one peak for each k pilot multipath signal components. The candidate pilot peaks are input to the controller 56.

An output of the pilot estimator 68 represents a filtered the pilot signal estimate having in-phase ($I_{pilot}$) and quadrature ($Q_{pilot}$) signal components, which is input to the pilot energy computation circuit 70 and the demodulator 72. An output of the pilot energy computation circuit 70 is connected to an input of the controller 56.

Pilot channel, primary paging channel, traffic channel, and QPCH channel outputs of the despreader/decover circuit 66 are input to the demodulator 72. A QPCH dot product and/or cross product output of the demodulator 72 represents the demodulated QPCH and is input to the controller 56, which includes QPCH combining and detecting circuitry or software (not shown) for analyzing the demodulated QPCH to determine if a full page on the primary paging channel is immediately forthcoming. Traffic and primary paging channel outputs are input to the Viterbi decoder 74 after further processing via subsystems (not shown) such as scaling circuits and de-interleaving circuits (see IS-95 specifications). An output of the decoder 74 is connected to an input of the controller 56. An output of the controller 56 is connected to an input of the ROC computation circuit 42, and output of which is connected to an input of the sample RAM 58 and to an input of the searcher 62.

In operation, CDMA signals received via the antenna 46 are directed to the CDMA receive chain 50 via the duplexer 48. The CDMA receive chain 50 includes radio frequency to intermediate frequency conversion circuitry (not shown) for mixing the received radio frequency signals (Rx) to intermediate frequency signals. Additional frequency conversion circuitry (not shown) mixes the intermediate frequency signals to analog baseband signals, which are then converted to digital base band signals via an analog-to-digital converter (not shown). The digital baseband signals include In-phase (I), Quadrature (Q), and noise signal components.

Similarly, the CDMA transmit chain 52 includes frequency conversion circuitry (not shown) for converting digital input signals (having I and Q signal components) output from the encoder 76 to analog radio frequency signals in preparation for transmission via the antenna 46.

The sample RAM 58 in the baseband processor 54 samples the digital baseband signals received from the CDMA receive chain 50 at predetermined time slots. The sample RAM 58 maintains the samples in a buffer (not shown) for use by offline processing circuitry as discussed more fully below. The predetermined time slots at which the sample RAM 58 performs sampling of the received signal are determined in accordance with IS-95 telecommunications standards. The sample RAM 58 may be selectively bypassed when the mobile station 26 is not operating in slotted mode without departing from the scope of the present invention.

The length of the signal sample taken by the sample RAM 58 is directly related to the size of the sample RAM 58. The sample RAM 58 samples the signal environment, i.e., the received signal, to gather sufficient information from a QPCH of the received signal to facilitate offline processing. As discussed more fully below, the unique design of the present invention helps minimize the required size of the sample RAM 58.

An output of the sample RAM 58 is input to the interpolator 60. The interpolator 60 upconverts a digital signal output from the sample RAM 58 to a higher digital frequency. In the present specific embodiment, the rate of the digital signal output from the sample RAM 58 is equivalent to the rate of the received digital signal, which is twice the chip rate. The interpolator 60 converts the rate of the signal output from the sample RAM 58 to eight times the chip rate (CHIP×8). Those skilled in the art will appreciate that the exact rates of digital signals employed by the mobile station 26 are application-specific and may be determined by one skilled in the art to meet the needs of a given application.

When the sample RAM 58 has sampled the received signal, the interpolator 60 provides an up-converted digital signal having in-phase and quadrature signal components to the searcher 62 and the despreader/decoder circuit 66. The searcher 62 analyzes the received digital signal and outputs, to the controller 56, candidate pilot signal peaks for k multipath signal components. k is a variable representing the number of detected multipath signal components of the received signal.

The unique searcher 62 includes an I-channel coherent integrator, a Q-channel coherent integrator, and a noncoherent integrator having novel integration lengths that minimize the required size of the sample RAM 58 while maintaining sufficient pilot signal detection accuracy, as discussed more fully below. The pilot estimator 68 is implemented as a Finite Impulse Response filter (FIR) or an Infinite Impulse Response filter (IIR) that filters noise from the decovered noisy pilot signal (having k multipath signal components) output from the despreader/decover circuit 66. The output of the pilot filter 68 is a pilot signal estimate ($\hat{P}_k$), which includes in-phase ($I_{pilot_k}$) and quadrature ($Q_{pilot_k}$) signal components associated with the $k^{th}$ pilot multipath signal component. $\hat{P}_k$ is described by the following:

$$\hat{P}_k = (I_{pilot_k}, Q_{pilot_k}), \qquad [1]$$

An additional subscript, such as 1 or 2 is added to specify whether a given signal component corresponds to a first symbol or a second symbol, respectively, of a slot of a received QPCH signal. For example, $\hat{P}_{1_k} = (I_{pilot1_k}, Q_{pilot1_k})$ refers to the $k^{th}$ multipath pilot estimate associated with the first QPCH symbol. A pilot signal is associated with or corresponds to a QPCH symbol when the pilot signal is received simultaneously with the QPCH symbol and is provided in the same signal sample of the sample RAM 58. The pilot signal is a dedicated beacon for coherently detecting any CDMA signal. In QPCH applications, preferably the dot and/or cross product between the pilot signal and the QPCH is employed for QPCH detection purposes.

The pilot signal estimate $\hat{P}$ is provided to the demodulator 72 and the pilot energy computation circuit 70. The pilot energy computation circuit 70 squares the pilot signal estimate $\hat{P}$ and provides an estimate of the energy ($E_{pilot1_k}$) of the pilot signal to the demodulator 72 and the controller 56. The controller 56 includes an integrator (not shown) that sums the sums the k pilot energies associated with the first QPCH symbol and the k pilot energies associated with the second QPCH symbol to yield the summed pilot energies $E_{pilot1}$ and $E_{pilot2}$, respectively, as described in the following equations:

$$E_{pilot1} = \sum_k E_{pilot1_k}, \qquad [2]$$

$$E_{pilot2} = \sum_k E_{pilot2_k}, \quad [3]$$

where $E_{pilot1_k}$ is the pilot energy associated with the $k^{th}$ multipath signal component of the first QPCH symbol of a QPCH slot, and $E_{pilot2_k}$ is the pilot energy associated with the $k^{th}$ multipath signal component of the second QPCH symbol of the QPCH slot.

The controller 56 includes software or circuitry for determining probability of false alarm ($P_{FA}$) and probability of detection ($P_D$) statistics based on the demodulated QPCH channel output from the demodulator 72. By transmitting known signals to the antenna 46 at predetermined times, the probability of falsely detecting a quick page ($P_{FA}$) and the probability of accurately detecting a quick page ($P_D$) may be easily determined via the controller 56. Other methods for determining $P_{FA}$ and $P_D$ may be employed without departing from the scope of the present invention.

The statistics $P_{FA}$ and $P_D$ are provided from the controller 56 to the ROC computation circuit 42. The ROC computation circuit 42 employs the ROC statistics $P_{FA}$ and $P_D$ to determine optimal integration lengths (M and N) for the integrators of the searcher, and the optimal size of the sample RAM 58 via unique methods of the present invention as discussed more fully below. The ROC computation circuit 42 computes receiver operating characteristics from the $P_{FA}$ and $P_D$ data output from the controller 56. The receiver operating characteristics specify how the probability of incorrectly demodulating a page of the QPCH ($P_{FA}$) varies with the probability of detection the page ($P_D$).

The ROC computation circuit 42 adjusts N and M until optimum values are achieved. Optimum values of N and M minimize the requisite size of the sample RAM 58 while maintaining the probability of false alarm and the probability of detection of the QPCH within acceptable limits. The acceptable limits are typically defined by customer specifications. For example, a customer may specify that the probability of successful call completion must be 98 percent. Consequently, the probability of successful detection ($P_D$) of a QPCH page multiplied by the probability of successfully detecting and demodulating a forthcoming primary page in response to the processing of the QPCH page and successfully establishing an associated traffic channel in response thereto must be below 98 percent. An acceptable probability of false alarm is established with reference to its impact on phone battery life. The exact value for the acceptable probability of false alarm is application-specific.

The values of N and M affect the requisite size of the sample RAM 58. Smaller values of N and M result in a smaller sample RAM 58. If no other size restrictions are imposed on the size of the sample RAM 58 by other circuitry, the size of the sample RAM 58 will be M×N. In the present specific embodiment, N and M are 512 and 2 or 4, respectively, which correspond to sample RAM sizes of 512×2 or 512×4, respectively. Those skilled in the art will appreciate that the exact size of the sample RAM 58 is implementation-specific, and may be different than 2×128 without departing from the scope of the present invention.

After N and M are determined and minimized for a particular application via the present invention, the ROC computation circuit 42 may be removed. Alternatively, the ROC computation circuit 42 may be employed to dynamically set the size of the sample RAM 58 and the integration lengths of the searcher 62.

Those skilled in the art will appreciate that the ROC computation circuit 42 may be omitted, and instead, appropriate integration lengths for integrators of the searcher 62 determined manually (experimentally in a laboratory) in accordance with the methods of the present invention without departing from the scope thereof.

In the present specific embodiment, the total energy of the signal received by the CDMA receive chain 50 is scaled to a predetermined value via Automatic Gain Control (AGC) circuitry (not shown) within the CDMA receive chain 50. Such AGC circuitry is known in the art. The predetermined value is an estimate of the total energy ($\hat{I}_o$) of the received signal and is known at the controller 56.

The despreader/decover circuit 66 includes a pseudo-noise despreader (not shown) and an M-ary Walsh decover circuit (not shown) for decovering a pilot channel, a data channel, a primary paging channel, and a QPCH from the received signal output from the interpolator 60, if they exist in the received signal. M is 64 in the present specific embodiment. The decovered channels are provided to the demodulator 72.

The demodulator 72 computes the dot product and/or cross product between a QPCH signal received from the despreader/decover circuit 66 and the pilot estimate $\hat{P}$ output from the pilot estimator 68. In the present specific embodiment, the QPCH signal includes a slot having a first symbol and a second symbol defined in accordance with the IS-95 telecommunications standard.

The dot product ($dot_1$) of the first QPCH symbol (QPCH1) with the corresponding pilot estimate $\hat{P}_1$ is defined in accordance with the following equation:

$$dot_1 = \sum_k (I_{pilot1_k} I_{QPCH1_k} + Q_{pilot1_k} Q_{QPCH1_k}), \quad [4]$$

where k is the number of available multipath components of the received signal; $I_{pilot_k}$ is the in-phase component of the pilot estimate associated with $k^{th}$ multipath component of the first QPCH symbol of the slot; $I_{QPCH1_k}$ is the in-phase component of the $k^{th}$ multipath component of the first QPCH symbol; $Q_{pilot1_k}$ is the quadrature component of the $k^{th}$ multipath component of the pilot estimate associated with the first QPCH symbol; $Q_{QPCH1_k}$ is the quadrature component of the $k^{th}$ multipath component of the first QPCH symbol of the QPCH signal.

Similarly, the dot product ($dot_2$) of the second QPCH symbol (QPCH2) with the corresponding pilot estimate $\hat{P}_2$ is defined in accordance with the following equation:

$$dot_2 = \sum_k (I_{pilot2_k} I_{QPCH2_k} + Q_{pilot2_k} Q_{QPCH2_k}), \quad [5]$$

where the individual symbols are similar to those defined above for equation (4) but are associated with the second QPCH symbol of a slot rather than the first QPCH symbol of the slot.

Additional details of quick paging channels employed for the purposes of offline processing are disclosed in copending U.S. patent application Ser. No. 08/865,650, filed on May 30, 1997, by Butler, et al., entitled DUAL CHANNEL SLOTTED PAGING, assigned to the assignee of the present invention and incorporated herein by reference. Further QPCH details are disclosed in copending U.S. patent application Ser. No. 09/252,846, filed on Feb. 19, 1999, by Agrawal, et al., entitled METHOD AND APPARATUS FOR MAXIMIZING STANDBY TIME USING A QUICK PAGING CHANNEL, assigned to the assignee of the present invention and incorporated herein by reference.

The demodulator 72 computes the first dot product (dot$_1$) associated with the first QPCH symbol, the second dot product (dot$_2$) associated with the second QPCH symbol, and/or the cross products cross$_1$ and cross$_2$ associated with the first and second QPCH symbols, respectively, and provides the results to the controller 56. The cross products cross$_1$ and cross$_2$ are defined in accordance with the following equations:

$$cross_1 = \sum_k (I_{pilot1_k} Q_{QPCH1_k} - Q_{pilot1_k} I_{QPCH1_k}), \quad [6]$$

$$cross_2 = \sum_k (I_{pilot2_k} Q_{QPCH2_k} - Q_{pilot2_k} I_{QPCH2_k}), \quad [7]$$

where the individual symbols are as defined above for equations (4) and (5).

Whether the demodulator 72 computes dot products, cross products, or sums of dot and cross products is application-specific and depends on the mode of the system 26. For example, in 1 Multi-Carrier (1×MC) systems without Orthogonal Transmit Diversity (OTD) (1×MC non OTD), the demodulator 72 computes dot and cross products in accordance with equations (4) through (7) and outputs dot$_1$+cross$_1$ and dot$_2$+cross$_2$ to the controller 56. In 3 Multi-Carrier (3×MC) systems and in 1×MC systems with OTD, the demodulator 72 outputs dot products, cross products, or sums of dot and cross products depending on the needs of a given application. With reference to the present teachings, the appropriate demodulator output may be determined by one ordinarily skilled in the art to meet the needs of a given application.

The output of the demodulator 72 that is input to the controller 56 is denoted QP$_1$ for outputs associated with the first QPCH symbol of a slot and QP$_2$ for outputs associated with the second QPCH symbol of a slot. Various outputs of the demodulator 72 for various system modes are summarized in the following table:

TABLE 1

| Mode | Quick Page Calculation (QP) |
|---|---|
| 1×MC non OTD | QP$_1$ = dot$_1$ + cross$_1$, |
|  | QP$_2$ = dot$_2$ + cross$_2$ |
| 1×MC OTD, or 3×MC | QP$_1$ = dot$_1$, cross$_1$, or dot$_1$ + cross$_1$ |
|  | QP$_2$ = dot$_2$, cross$_2$, or dot$_2$ + cross$_2$ |

Alternatively, another combinative function of the pilot estimate and the first and second QPCH symbols may be provided to the QPCH combiner 40 in addition to or instead of the dot and/or cross products, without departing from the scope of the present invention.

The demodulator 72 may also provide a data/traffic signal, if available, to the Viterbi decoder 74 when the mobile station 26 is handling a call or other type of traffic channel. The decoder 74 may then decode the data/traffic signal, which may represent voice or another type of data, and forward the decoded signal to the controller 56. The controller 56 employs various hardware and/or software modules (not shown) to route the decoded signals to a microphone or to another software or hardware function (not shown).

The controller 56 includes functionality for implementing a QPCH combiner (not shown) that employs the Quick Paging (QP) values QP$_1$ and QP$_2$, the pilot energy estimates E$_{pilot1}$ and E$_{pilot2}$, and received signal energy estimates $\hat{I}_{o1}$ and $\hat{I}_{o2}$ associated with the first and second QPCH symbols, respectively, to compute a first decision parameter (CSI) and a second decision parameter (D). The second decision parameter D is also called the demodulation symbol. The first decision parameter CSI is a carrier signal to interference ratio and is described by the following equation:

$$CSI = \left(\frac{E_{pilot}}{\hat{I}_o}\right)_{combined} = \frac{E_{pilot1}}{\hat{I}_{o1}} + \frac{E_{pilot2}}{\hat{I}_{o2}}, \quad [8]$$

where CSI is equivalent to $$\left(\frac{E_{pilot}}{\hat{I}_o}\right)_{combined},$$

which is the combined pilot to interference ratio for the first and second QPCH symbols; E$_{pilot1}$ is the energy of the portion of the pilot signal received simultaneously with the first QPCH symbol; E$_{pilot2}$ is the energy of the portion of the pilot signal received simultaneously with the second QPCH symbol; $\hat{I}_{o1}$ is total the energy of the portion of the received signal, including noise and interference, received simultaneously with the first QPCH symbol; and $\hat{I}_{o2}$ is total the energy of the portion of the received signal, including noise and interference, received simultaneously with the second QPCH symbol. In the present specific embodiment, $\hat{I}_{o1}$ and $\hat{I}_{o2}$ are predetermined via AGC circuitry and Gain Control Amplifiers (GCA's) (not shown) in the CDMA receive chain 50, however, $\hat{I}_{o1}$ and $\hat{I}_{o2}$ may be estimated via energy estimators or determined via other mechanisms without departing from the scope of the present invention.

The second decision parameter D is a novel decision metric that is described by the following equation:

$$D = \frac{QP_1 + QP_2}{E_{pilot1} + E_{pilot2}}, \quad [9]$$

where QP$_1$ is either dot$_1$, cross$_1$, or dot$_1$+cross$_1$ as indicated in table 1; QP$_2$ is either dot$_2$, cross$_2$, or dot$_2$+cross$_2$ as indicated in table 1; and E$_{pilot1}$ and E$_{pilot2}$ are as described above.

The controller 56 combines the parameters CSI and D over all available multipath components. The results (CSI and D) may be stored in memory (not shown) and selectively accessed to determine whether the mobile station 26 should subsequently power up the CDMA receiver 50 to receive and process a forthcoming full page sent via the primary paging channel.

The QPCH page detecting functionality (not shown) within the controller 56 initially compares the CSI parameter to an erasure threshold T$_{erasure}$. If CSI>T$_{erasure}$, then erasure is declared. The erasure threshold T$_{erasure}$ is set so that when erasure is declared, the signal environment through which received signals are propagating is corrupted with noise or other interference, and the QPCH cannot accurately indicate the presence or absence of a forthcoming page message on a primary paging channel. Consequently, the forthcoming primary paging channel is processed to prevent the unnecessary dropping of calls.

When CSI<T$_{erasure}$, the CDMA receiver 50 is activated in accordance with IS-95 standards to receive and demodulate a forthcoming primary paging channel. The controller 56 then activates the CDMA receiver 50 and places the sample RAM 58 in bypass mode via control signals delivered via the bus 78 at a time corresponding to a slot during which the primary paging channel is to be received. The Viterbi decoder 74 is automatically enabled via signaling information encoded in each packet and decodes the primary paging channel or traffic channel input from the demodulator 72. The decoded primary paging channel or traffic channel is provided to the controller 56.

When the mobile station 26 receives the full page, i.e., primary page, via the primary paging channel, the page is despread via the despreader/decover circuit 66, combined over multipath components via the demodulator 72 and provided to the decoder 74, where the page is decoded and constituent page information is forwarded to the controller 56. Software and/or hardware circuitry known in the art (not shown) within the controller 56 interprets the page. If the full page indicates a forthcoming traffic channel, the controller 56 issues appropriate control commands to various modules within the mobile station 26 to prepare the mobile station 26 to handle the forthcoming traffic channel.

If CSI>$T_{erasure}$, the decision parameter (demodulation symbol) D is compared to an on-off threshold $T_{1/0}$. If D>$T_{1/0}$, then the controller 56 processes the forthcoming primary paging channel in accordance with IS-95 standards. The controller 56 then takes appropriate steps to prepare the mobile station 26 for the receipt of the primary paging channel and the processing of the associated page.

If D<$T_{1/0}$, then the controller 56 assumes that a full page on the primary paging channel is not forthcoming. The controller 56 then powers-down the transceiver section 44 and enters the mobile station 26 into a sleep state as defined in accordance with IS-95 telecommunications standards.

The QPCH is On-Off Keying (OOK) modulated, and the value of D is used to indicate the presence or absence (on or off, respectively) of a forthcoming paging channel. The exact values of the erasure threshold $T_{erasure}$ and the on-off threshold $T_{1/0}$ are application-specific and may be determined by one skilled in the art to meet the needs of a given application.

Alternatively, the QPCH combiner/detector functionality of the controller 56 may be implemented in accordance with the teachings if U.S. patent application Ser. No. 09/695,808, filed on Oct. 24, 2000, by the inventor of the present invention, entitled WIRELESS COMMUNICATIONS RECEIVER EMPLOYING QUICK PAGING CHANNEL SYMBOLS AND NOISE POWER ESTIMATES TO FACILITATE DETECTION OF A PRIMARY PAGING CHANNEL, assigned to the assignee of the present invention, and incorporated herein by reference.

Alternatively, the QPCH combiner/detector functionality of the controller 56 may be implemented in accordance with the teachings if U.S. patent application Ser. No. 09/955,521, filed on Sep. 12, 2001, by the inventor of the present invention, entitled WIRELESS COMMUNICATIONS RECEIVER EMPLOYING QUICK PAGING CHANNEL SYMBOLS AND CHANNEL QUALITY PARAMETERS TO FACILITATE DETECTION OF A PRIMARY CHANNEL, assigned to the assignee of the present invention, and incorporated herein by reference.

Alternatively, the QPCH combiner/detector functionality of the controller 56 may be implemented in accordance with the teachings if U.S. patent application Ser. No. 09/952,722, filed on Sep. 13, 2001, by the inventor of the present invention, entitled QUICK PAGING CHANNEL RECEIVER FOR A WIRELESS COMMUNICATIONS SYSTEM, assigned to the assignee of the present invention, and incorporated herein by reference.

Alternatively, the QPCH combiner/detector functionality of the controller 56 may be implemented in accordance with the teachings if U.S. patent application Ser. No. 09/761,219, filed on Jan. 18, 2001, by the inventor of the present invention, entitled DUAL PAGING CHANNEL RECEIVER FOR A WIRELESS COMMUNICATIONS SYSTEM, assigned to the assignee of the present invention, and incorporated herein by reference.

Alternatively, the QPCH combiner/detector functionality of the controller 56 may be implemented in accordance with the teachings if U.S. patent application Ser. No. 09/761,342, filed on Jan. 16, 2001, by the inventor of the present invention, entitled WIRELESS COMMUNICATIONS RECEIVER EMPLOYING A UNIQUE COMBINATION OF QUICK PAGING CHANNEL SYMBOLS TO FACILITATE DETECTION OF A PRIMARY PAGING CHANNEL, assigned to the assignee of the present invention, and incorporated herein by reference.

Figure 3:
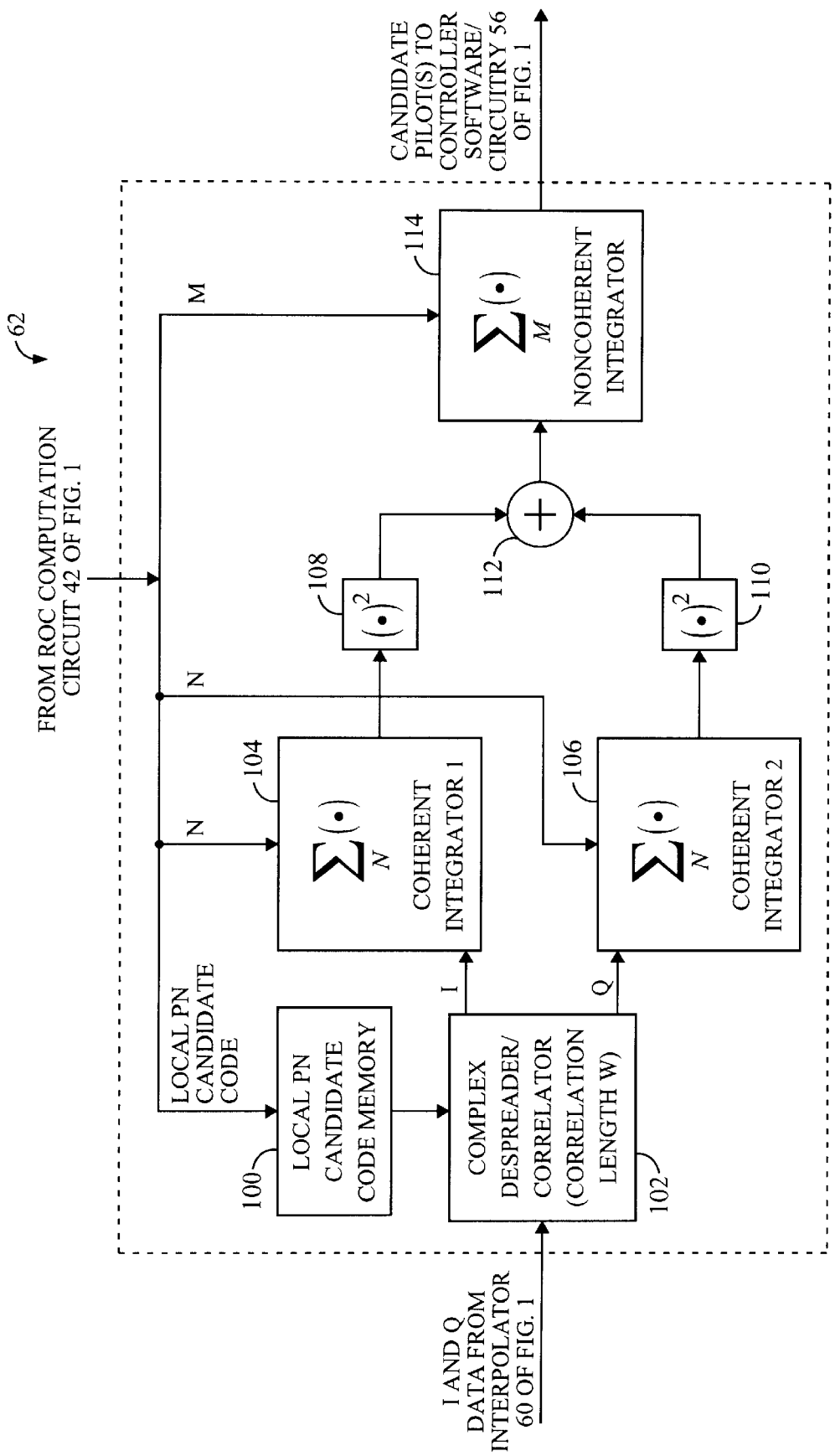
FIG. 3 is a more detailed diagram of the searcher of FIG. 2.

FIG. 3 is a more detailed diagram of the searcher 62 of FIG. 2. The searcher 62 includes from top to bottom and left to right a local Pseudo Noise (PN) candidate code memory 100, a complex despreader/correlator 102, an I-channel coherent integrator 104 for coherently integrating an I-channel output from the complex despreader/correlator 102, a Q-channel coherent integrator 106 for integrating a Q-channel output from the complex despreader/correlator 102, a first squaring circuit 108, a second squaring circuit 110, an adder 112, and a non-coherent integrator 114.

The complex despreader/correlator 102 receives the digital signal output from the interpolator 60 of FIG. 2. Another input of the complex despreader/correlator 102 is connected to an output of the local PN candidate code memory 100. A first output of the complex despreader/correlator 102 is connected to an input of the I-channel coherent integrator 104. A second output of the complex despreader/correlator 102 is connected to an input of the Q-channel coherent integrator 106. Outputs of the I-channel coherent integrator 104 and the Q-channel coherent integrator 106 are connected to inputs of the first squaring circuit 108 and the second squaring circuit 110, respectively. Outputs of the squaring circuits 108 and 110 are connected to inputs of the adder 112. An output of the adder 112 is connected to an input of the noncoherent integrator 114. An output of the noncoherent integrator 114 is connected to an input of the controller 56 of FIG. 2. The local PN candidate code memory 100 and the integrators 104, 106, and 114 receive control input from the controller 56 of FIG. 2.

With reference to FIGS. 2 and 3, the complex despreader/correlator 102 receives the digital signal output from the interpolator 60 and correlates the signal with a local PN candidate code stored in the local PN candidate code memory 100. The local candidate code is application-specific and may be updated by software and/or hardware running on the controller 56 to meet the needs of a given application. When the digital signal received from the interpolator 60 matches the local candidate code, the result of the correlation reaches a maximum. The result of the correlation between the candidate code and the received digital signal is provided to the I-channel coherent integrator 104 and the Q-channel coherent integrator 106. The coherent integrators 104 and 106 sum the output of the complex despreader/correlator 102 over N chips and provide the resulting sums to the squaring circuits 108 and 110, respectively. The squaring circuits 108 and 110 square the sums. The adder 112 adds the resulting squares of the sums and inputs the result to the noncoherent integrator 114. The noncoherent integrator 114 then noncoherently sums M values output from the adder 112 to yield a noisy pilot estimate as output in response thereto. The noisy pilot estimate includes a candidate peak corresponding to each pilot multipath signal component.

The ROC computation circuit 42 of FIG. 2 determines receiver operating characteristics based on $P_{FA}$ and $P_D$, which are computed by the controller 56 and are based on the output of the searcher 62 and the output of the pilot energy computation circuit 70. The receiver operating characteristics are employed by software or hardware running on the ROC computation circuit 42 to adjust the coherent integration length N for the integrators 104 and 106 and the noncoherent integration length M for the noncoherent integrator 114. The integration lengths N and M are then dynamically changed in response to control input from the-ROC computation circuit 42 specifying new values for N and M.

Those skilled in the art will appreciate that N and M may be a priori determined in a laboratory instead of dynamically via the ROC computation circuit 42 and associated software running on the controller 56 without departing from the scope of the present invention. Integrators, such as the coherent integrators 104 and 106 and the noncoherent integrator 114, whose integration lengths may be updated in response to control inputs, are known in the art.

Figure 4:
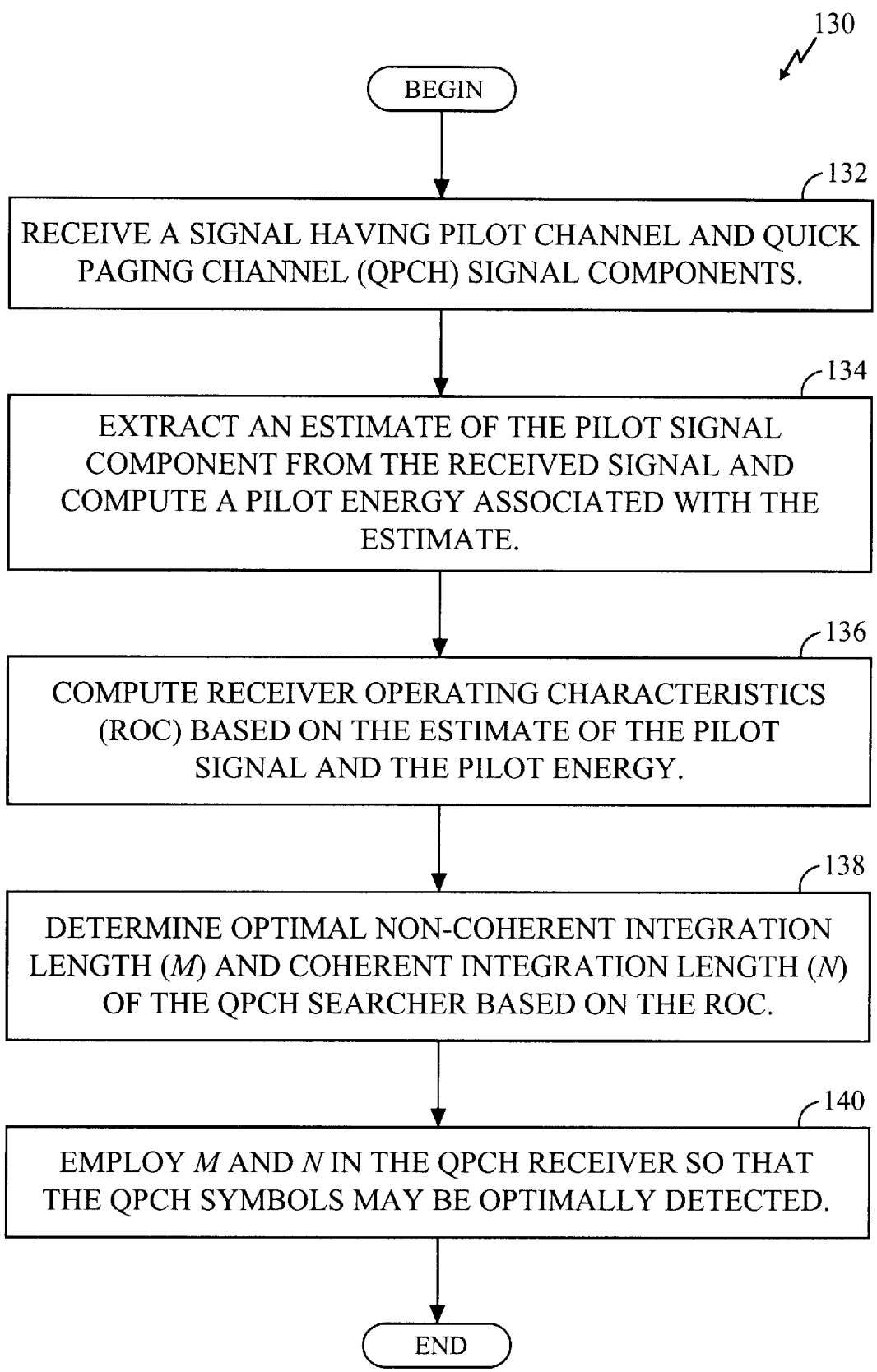
FIG. 4 is a flow diagram of a method employed by the mobile station of FIG. 2 to selectively update searcher parameters.

FIG. 4 is a flow diagram of a method 130 employed by the mobile station 26 of FIG. 2 to select optimum integration lengths for the integrators 104, 106, and 114 of the searcher 62 of FIG. 3.

With reference to FIGS. 2, 3, and 4, in an initial receiving step 132, a digital received signal is output from the interpolator 60 and is provided to the searcher 62. The digital received signal includes a pilot signal channel and a QPCH associated with pilot signal and QPCH signal components, respectively. Subsequently, control is passed to a pilot extraction step 134.

In the subsequent pilot extraction step 134, an estimate of the pilot signal component of the received signal is provided by the pilot estimator 68 to the pilot energy computation circuit 70. The pilot energy computation circuit 70 computes the pilot energy associated with the estimate of the pilot signal component. Subsequently, control is passed to an ROC step 136.

In the ROC step 136, operating characteristics of the receive chain 50, i.e., receiver operating characteristics are computed by the ROC computation circuit 42 based on $P_{FA}$ and $P_D$ derived from estimates of the pilot signal, the pilot energy, and the demodulated QPCH channel output from the demodulator 72 of FIG. 2. Methods for computing $P_{FA}$ and $P_D$ from predetermined signal inputs are known in the art and may be adapted for use with the present invention by one ordinarily skilled in the art. Subsequently, control is passed to a parameter selection step 138.

In the parameter selection step 138, the controller 56 selects optimal values for the non-coherent integration length M of the noncoherent integrator 114 and integration lengths N of the coherent integrators 104 and 106 based on the receiver operating characteristics. The parameters M and N are chosen by the ROC computation circuit 42 so that the minimum sizes of M an N are selected that still result in receiver operating characteristics being within acceptable limits. The acceptable limits are application-specific and may be determined by one skilled in the art to meet the needs of a given application. Subsequently, control is passed to a parameter-updating step 140.

In the parameter-updating step 140, the optimal values for N and M determined in the proceeding parameter selection step 138 are employed by the integrators 104, 106, and 114 of the searcher 62 of FIGS. 2 and 3. The sample RAM 58 of FIG. 2 is at least M×N chips in duration to permit effective searching.

Figure 5:
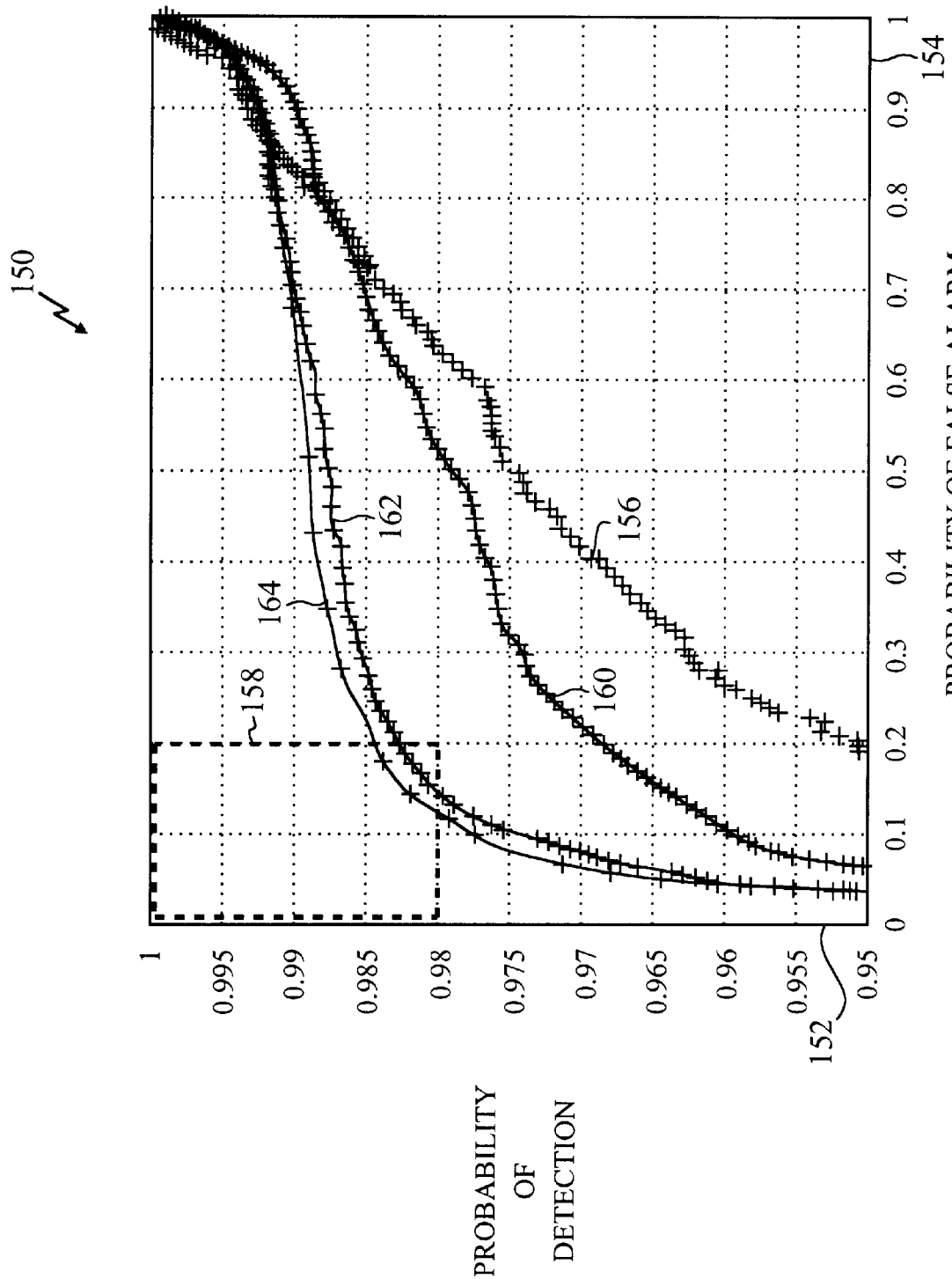
FIG. 5 is an exemplary graph of receiver operating characteristics employed by the method of FIG. 4.

FIG. 5 is an exemplary graph 150 of receiver operating characteristics employed by the method of FIG. 4. The graph 150 includes a vertical axis 152 representing the probability of accurate detection of a QPCH symbol and a horizontal axis 154 representing the probability of falsely detecting a QPCH symbol. The graph 150 and associated receiver operating characteristic curves are for a signal fading multipath. When more pilot signal multipaths are detected, the receiver operating characteristic curves change.

With reference to FIGS. 2 and 3, a first curve 156 represents the ROC when the searcher 62 employs a coherent integration length N=512 and a noncoherent integration length M=1. The first curve 156 has a relatively poor ROC and falls outside a desired region 158.

A second curve 160 corresponds to a coherent integration length N=512 and a noncoherent integration length of M=2. The second curve 160 has a slightly improved ROC but still falls outside the desired region 158.

A third curve 162 corresponds to a coherent integration length of N=512 and a noncoherent integration length of M=4. The third curve 162 is very similar to an ideal curve 164, both of which pass through the desired region 158. The desired region 158 represents a region in which the probability of detection and the probability of false alarm are within acceptable limits.

Hence, by choosing a coherent integration length of N=512 and a noncoherent integration length of M=4, close to ideal performance is achieved with minimum sizes for M and N.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for facilitating the detection and successful decoding of a quick paging channel comprising:

first means for detecting a pilot signal associated with a quick paging channel based on a received signal, said first means having a coherent integrator of a first length and a noncoherent integrator of a second length;

second means for determining operating characteristics of said system based on said pilot signal; and third means for optimizing said first length and said second length based on said operating characteristics.

2. The system of claim 1 wherein said first means includes a code division multiple access receive chain for receiving said received signal and providing a digital received signal in response thereto to a sample random access memory.

3. The system of claim 2 wherein said sample random access memory includes means for sampling said digital receive signal at predetermined time slots and providing a sampled received signal in response thereto.

4. The system of claim 3 wherein said first means includes an interpolator for adjusting a rate of said sampled received signal and providing a rate-adjusted signal in response thereto.

5. The system of claim 4 wherein said first means includes a searcher having said first coherent integrator and said noncoherent integrator.

6. The system of claim 5 wherein said searcher further includes a second coherent integrator.

7. The system of claim 6 wherein said searcher includes a complex despreader/correlator for correlating said rate-adjusted received signal with a pseudo noise candidate code and providing a correlation result in response thereto.

8. The system of claim 7 wherein said first integrator and said second integrator integrate include means for coherently integrating said correlation result over a predetermined number of chips corresponding to said first length and providing first and second integrated values, respectively, in response thereto.

9. The system of claim 8 wherein said searcher further includes means for squaring said first and second integrated values and providing first and second squared values, respectively, in response thereto.

10. The system of claim 9 wherein said searcher further includes means for adding said first and second squared values and providing a sum in response thereto.

11. The system of claim 10 wherein said noncoherent integrator includes means for noncoherently integrating said sum over a predetermined number of values and outputting a pilot estimate in response thereto of said pilot signal, said predetermined number corresponding to said second length.

12. The system of claim 11 wherein said first means further includes means for computing a pilot energy associated with said pilot estimate from said pilot estimate.

13. The system of claim 12 wherein said second means includes means for providing said receiver operating characteristics based on said pilot estimate and said pilot energy.

14. The system of claim 13 wherein third means includes a circuit for computing, based on said receiver operating characteristics, optimal values for said first length and said second length and for selectively adjusting said first length and said second length in response thereto.

15. The system of claim 14 wherein said first length is 512 and said second length is less than or equal to 4.

16. A system for facilitating the detection of a forthcoming primary paging channel in a wireless communications network comprising:
   first means for establishing a communications link between a first communications device and a second communications device of said wireless communications network, said communications link supporting a quick paging channel, a primary paging channel, and a traffic channel;
   second means for detecting a predetermined signal transmitted via said quick paging channel, said predetermined signal indicative of a forthcoming message on said primary paging channel, said second means including a searcher having one or more integrators, said forthcoming paging message indicative of an incoming call on said traffic channel;
   third means for selecting an integration length for said one or more integrators based on receiver operating characteristics of said second wireless communications device; and
   fourth means for employing said predetermined signal to eliminate redundant processing of said primary paging channel, said predetermined signal received by said second wireless communications device from said first communications device via said quick paging channel prior to the transmission of said forthcoming paging message on said primary paging channel.

17. The system of claim 16 wherein said first communications device includes a base station and a base station controller.

18. The system of claim 17 wherein said second communications device is a wireless phone.

19. The system of claim 18 wherein said wireless communications network is a code division multiple access communications network.

20. The system of claim 18 wherein said predetermined signal includes a quick paging channel signal transmitted by said base station during a predetermined time slot for a predetermined duration, said quick paging channel signal having a symbol representative of a first binary value or a second binary value indicative of a forthcoming paging message or lack thereof, respectively.

21. The system of claim 20 wherein said second means includes a coherent integrator and a noncoherent integrator.

22. The system of claim 21 wherein said noncoherent integrator has a correlation length of 2.

23. The system of claim 21 wherein said coherent integrator has a correlation length of 512.

24. A system for extending standby time of a wireless communications device comprising:
   first means for employing a short page broadcast to said wireless communications device via an associated wireless communications system, said short page indicating if a subsequent longer page should be processed by said wireless communications device;
   second means for searching for said short page and providing a page indication in response thereto if said short page is detected by said second means, said second means including a first signal summing device and a second signal summing device;
   third means for optimizing computation lengths of said first and second signal summing devices based on operating characteristics of said system;
   fourth means for processing said page indication to determine if said longer page is forthcoming and providing a signal in response thereto; and
   fifth means for processing said forthcoming longer page in response to said signal.

25. A system for facilitating the detection and successful decoding of a quick paging channel comprising:
   first means for receiving and decovering said quick paging channel;
   second means for computing energies associated with said quick paging channel, said second means including a searcher having a coherent integrator of a first length and a noncoherent integrator of a second length;
   third means for computing operating characteristics of said first means based on said energies; and
   fourth means for optimizing said first length and said second length based on said receiver operating characteristics.

26. The system of claim 25 further including means for employing said first length and said second length in said second means for optimally detecting symbols received via said quick paging channel.

27. A system for facilitating the detection and successful decoding of a quick paging channel in a wireless communications system supporting a quick paging channel and a primary paging channel comprising:
   a quick paging channel searcher that facilitates quick paging channel detection, said searcher having a coherent integrator and a noncoherent integrator with integration lengths of 512 and 4, respectively;
   a controller that receives quick paging channel messages in response to said quick paging channel detection and provides a first indication in response thereto; and
   processing circuitry that processes a forthcoming paging channel when said first indication indicates a forthcoming primary paging channel.

28. In a system characterized by a coherent integrator of a first length and noncoherent integrator of a second length, a method of facilitating the detection and successful decoding of a quick paging channel comprising:

detecting a pilot signal associated with a quick paging channel based on a received signal;

determining operating characteristics of the system based on the pilot signal; and optimizing the first length and the second length based on the operating characteristics.

* * * * *